United States Patent Office 3,281,410
Patented Oct. 25, 1966

3,281,410
5'-DEOXY-5'-PYRIDINIUM NUCLEOSIDE SALTS AND DERIVATIVES THEREOF
Heinrich H. Peter, Pasadena, and John G. Moffatt, Palo Alto, Calif., assignors to Syntex Corporation, Panama, Panama, a corporation of Panama
No Drawing. Filed June 29, 1964, Ser. No. 378,935
24 Claims. (Cl. 260—211.5)

This invention relates to novel nucleoside derivatives and to novel methods for their preparation.

More particularly, this invention relates, first of all, to novel 5'-deoxy-5'-pyridinium (including substituted pyridinium) nucleoside salts represented by the general formula:

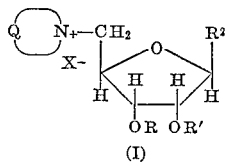

(I)

In this formula R and R' each represent hydrogen or an acyl radical, preferably one derived from a saturated or unsaturated hydrocarbon carboxylic acid containing less than 12 carbon atoms which can be straight, branched, cyclic, cyclic-aliphatic or aromatic, and which can also either be unsubstituted or substituted with one or more non-interfering substituents, such as functionally converted hydroxyl groups, e.g., alkoxy and aryloxy groups containing up to 6 carbon atoms or acyloxy groups containing up to 12 carbon atoms, nitro groups, amino groups, or halogen atoms, e.g., fluorine. Included among such preferred acyl groups are those derived from acetic, aminoacetic, trimethylacetic, t-butylacetic, phenoxyacetic, trifluoroacetic, propionic, cyclopentylpropionic, enanthic and benzoic acids, and the like.

R and R', together with the oxygen atoms to which they are attached, can also represent labile ether groupings, i.e., ones easily removable by acid hydrolysis, such as tetrahydrofuranyloxy, tetrahydropyranyloxy, diphenylmethoxy, triphenylmethoxy, p-nitrophenoxy and benzyloxy groups, and the like, or together they can represetnt a grouping represented by the general formula:

$$\begin{array}{c} -O \\ \phantom{-}\diagdown \\ \phantom{-O}C \\ \phantom{-}\diagup\phantom{O} \diagdown \\ -O \phantom{OOOO} R^4 \end{array} \begin{array}{c} R^3 \\ \\ \\ \\ \end{array}$$

(II)

wherein $R^3$ represents hydrogen or a lower alkyl group, e.g., methyl, ethyl, propyl, and the like, and $R^4$ represents hydrogen, a lower alkyl group, or an aryl (including alkaryl and aralkyl) group, e.g., phenyl, tolyl, benzyl, and the like.

The symbol $R^2$ represents a substituted purine or pyrimidine base, such as those represented by the general formulas:

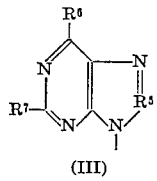 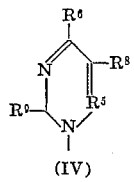

(III)  (IV)

wherein $R^5$ represents the grouping

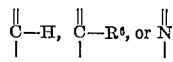

$R^6$ represents a hydroxyl group, an amino group, a mercapto group, including lower alkyl mercapto groups such as methylmercapto and the like, fluorine, chlorine, bromine, iodine or a halo-lower alkyl group, e.g., trifluoromethyl or the like; $R^7$ represents a hydroxyl group, an amino group or a mercapto (including lower alkyl mercapto) group; $R^8$ represents hydrogen, methyl, fluorine, chlorine, bromine, iodine, a halo-lower alkyl group, an amino group, an amido group, a nitro group, a cyano group, or a carboxyl group, and $R^9$ represents a keto group, an imino (N=) group, or a thio (S=) group.

Included among the more commonly encountered of these groups are substituted purine groups such as adenine, guanine, 8-azaguanine, 8-azaadenine, isoguanine, xanthine, hypoxanthine, 6-mercaptopurine, diaminopurine, 6-methylthiopurine, and the like, and substituted pyrimidine groups such as uracil, 5-fluorouracil, 5-chlorouracil, 5-bromouracil, 5-iodouracil, 5-trifluoromethyluracil, 6-azauracil, 2-thiouracil, cytosine, 5-fluorocytosine, 5-chlorocytosine, 5-bromocytosine, 5-iodocytosine, 5-trifluoromethylcytosine, 6-azacytosine, thymine, 2-thiothymine, and the like.

The grouping

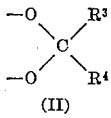

represents the residue of a pyridine or substituted pyridine, e.g., alkyl-substituted, base, i.e., an aromatic, heterocyclic radical derived from a pyridine base, preferably a pyridine base containing only carbon, hydrogen and nitrogen and having from 5 to 9 carbon atoms, inclusive, such as pyridine itself, α-collidine, β-collidine, γ-collidine, 2,4-lutidine, 2,6-lutidine, 3,4-lutidine quinoline, isoquinoline, α-picoline, β-picoline, γ-picoline, and the like.

The symbol $X^-$ represents an organic or inorganic saltfoming anion, such as methanesulfonate, benzenesulfonate, p-toluenesulfonate, p-nitrobenzenesulfonate, acetate, propionate, benzoate, oxalate, succinate, chloride, bromide, iodide, nitrate, sulfate, or the like.

This invention also relates to novel 2',5'-dideoxy-5'-pyridinium nucleoside salts represented by the general formula:

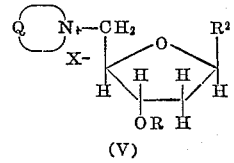

(V)

wherein R, $R^2$,

and $X^-$ have the same meaning as set forth hereinabove for Formula I.

This invention further relates to novel 2',3',5'-trideoxy-5'-pyridinium nucleoside salts represented by the general formula:

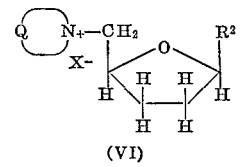

(VI)

wherein $R^2$,

and $X^-$ have the same meanings as set forth hereinabove for Formula I.

This invention also relates to novel 5'-deoxy-, 2',5'-dideoxy- and 2',3',5'-trideoxy-5'-tetrahydropyrido (including substituted tetrahydropyrido) nucleosides represented by the general formula:

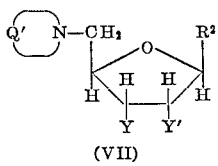

(VII)

In this formula R² has the same meaning as set forth hereinabove for Formula I; Y represents hydrogen or the grouping OR, and Y' represents hydrogen or the grouping OR', with Y' being hydrogen when Y is hydrogen, where R and R' have the same meanings as set forth hereinabove for Formula I, and the grouping

represents a tetrahydro-pyrido (including substituted tetrahydropyrido) group which corresponds to the pyridinium or substituted pyridinium group in its pyridinium nucleoside salt precursor. Thus, for example, where the precursor contains the pyridinum group:

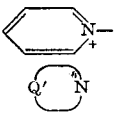

will represent the grouping:

Finally, this invention relates to novel processes for the preparation of the above-described 5'-deoxy-, 2',5'-dideoxy- and 2',3',5'-trideoxy-5'-pyridinium nucleoside salts and the corresponding tetrahydropyrido nucleosides, one of which processes can be illustrated schematically as follows:

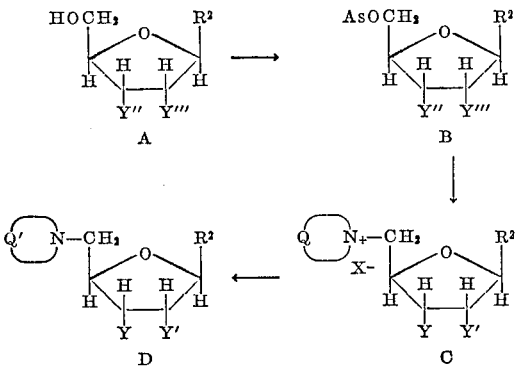

In these formulas R²,

and X⁻ have the same meanings as set forth hereinabove for Formula I;

Y and Y' have the same meanings as set forth hereinabove for Formula VII; Y'' represents hydrogen or the grouping –OZ, wherein Z represents an acyl group or a labile ether group of the type referred to hereinabove; Y''' represents hydrogen or the grouping –OZ, Y'' and Y''' taken together can also represent the grouping

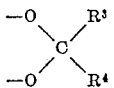

wherein R³ and R⁴ have the same meanings as set forth hereinabove for Formula II, and As represents an alkyl- or arylsulfonyl group, such as methanesulfonyl, benzenesulfonyl, p-toluenesulfonyl, p-nitrobenzenesulfonyl, and the like.

In carrying out the above-illustrated process, the starting material A, which is a 2',3'-O-(lower)alkylidene nucleoside, a 2',3'-O-aryl(lower)alkylidene nucleoside, a 2',3'-O-bis(etherified) nucleoside wherein the ether groups are labile ether groups, a 2'3'-O-bis(esterified) nucleoside, a 2'-deoxy-3'-O-acyl nuleoside, a 2'-deoxy-3'-O-etherified (e.g., tetrahydropyranyl) nucleoside, or a 2',3'-dideoxy nucleoside, all of which have a free 5'-hydroxyl group, e.g., 2',3'-O-isopropylideneuridine (A; Y''+Y'''=isopropylidenedioxy; R²=uracil), is dissolved in a liquid aromatic heterocyclic tertiary amine, preferably one which contains only carbon, nitrogen and hydrogen, such as pyridine and the other pyridine bases mentioned hereinabove, and, reacted, under substantially anhydrous conditions, with an alkyl- or arylsulfonyl halide, preferably a chloride, such as methanesulfonyl chloride, benzenesulfonyl chloride, p-toluenesulfonyl chloride, p-nitrobenzenesulfonyl chloride, and the like, to give the corresponding 5'-alkyl- or arylsulfonyloxy derivative B, e.g., 2',3'-O-isopropylidene-5'-O-p-nitrobenzenesulfonyluridine (B; Y''+Y'''=isopropylidenedioxy, As=p-nitrobenzenesulfonyl, R²=uracil).

This reaction will generally be carried out at a temperature of from about −20° C. to about +20° C., preferably at a temperature of from about −10° C. to about +5° C., for from about 1 to about 24 hours, and ordinarily from about 1 to about 2 mols, and preferably from about 1.05 to about 1.2 mols, i.e., a slight excess of the alkyl or arylsulfonyl halide will be employed per mol of the nucleoside starting material.

The thus-obtained 5'-alkyl- or -arylsulfonyloxy derivative, when reacted with pyridine or a pyridine base of the type described hereabove, under substantially anhydrous conditions and under an inert atmosphere, e.g., an inert nitrogen atmosphere, at a temperature of from room temperature (about 25° C.) to about 120° C. or higher for from about 30 minutes or less to several days, e.g., 72 hours or more, and preferably at a temperature of about 100° C. for about 1 hour, gives the corresponding 5'-deoxy-5'-pyridinium alkyl- or -arylsulfonate derivative C, e.g., 2',3'-O-isopropylidene-5'-deoxy-5'-pyridiniumuridine p-nitrobenzenesulfonate (C; Y+Y'= isopropylidenedioxy,

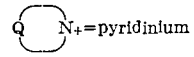

X=p-nitrobenzenesulfonate, R²=uracil).

The thus-obtained alkyl- or arylsulfonate salt can be converted either at this point or later to other organic or inorganic salts, using methods which are well known to those skilled in the art. Thus, for example, by passing the alkyl- or arylsulfonate salt through a column containing a suitable ion-exchange resin, e.g., one containing a "Dowex" (Dow Chemical Co.) or "Amberlite" (Rohm & Hass Co.) ion-exchange resin in a salt form (such as Dowex 1, a divinylbenzene cross-linked polystyrene substituted with trimethyl benzyl ammonium groups, in the chloride form), the corresponding organic or inorganic salts can be obtained.

The (lower)alkylidene, aryl(lower)alkylidene and labile ether groupings used as protective groups can be removed from the 5'-deoxy-, 2',5'-dideoxy- and 2',3',5'-trideoxy-5'-pyridinium nucleoside salts to give the corresponding free 2',3'-dihydroxy and 3'-hydroxy compounds by procedures well known to those skilled in the art. Thus, for example, the 2',3'-O-(lower)alkylidene and -aryl(lower)alkylidene derivatives can be contacted with aqueous formic acid, acetic acid, or the like, preferably of from about 30% to about 95% strength, at a temperature of from about 10° C. to about 40° C. for from about 2 to about 24 hours, to remove the (lower)alkylidene or aryl (lower)alkylidene group, while the 2',3'-O-bis(ether) and 3'-O-ether derivatives, e.g., tetrahydropyranyl ether derivatives, can be hydrolyzed using aqueous 50–95% formic or acetic acid at a temperature of from about 10° C. to about 40° C. for from about 2 to about 24 hours.

The removal of ester groups from the 2'- and/or 3'-positions will preferably be accomplished either before the 5'-alkyl- or -arylsulfonyloxy derivative is reacted with pyridine or a pyridine base to give the corresponding 5'-deoxy-6'-pyridinium alkyl- or -arylsulfonate derivative or after said pyridinium derivative, or another salt thereof, has been converted to the corresponding 5'-deoxy-5'-tetrahydropyrido or substituted tetrahydropyrido derivative.

In the first case mild hydrolysis of a 2',3'-O-bis-(ester or 3'-O-ester of a 5'-deoxy-5'-alkyl- or -arylsulfonyl-oxy derivative with dilute aqueous sodium hydroxide, e.g., 0.1 N or weaker, potassium hydroxide, or the like at room temperature will remove the acyl groups at the 2'- and/or 3'-positions while leaving the 5'-alkyl- or arylsulfonyloxy group intact. The resulting 2',3'-dihydroxy or 3'-hydroxy nucleoside can then be reacted with pyridine or another pyridine base to give the corresponding 5'-deoxy-5'-pyridinium alkyl- or arylsulfonate, unesterified at the 2'- and/or the 3'-position.

In the latter case, not only ester groups but also (lower) alkylidine, aryl(lower)alkylidene and labile ether groupings can be removed by known procedures; the ester groups by hydrolyzing the 5'-deoxy-, 2',5'-dideoxy- or 2',3',5'-trideoxy-5'-tetrahydropyrido nucleoside under alkaline conditions, e.g., using potassium carbonate in methanol/water solution at temperatures up to reflux, the remaining protective groups in the manner described hereinabove for the treatment of the corresponding (lower) alkylidene-, aryl(lower)alkylidene and labile ether-substituted pyridinium mucleosides.

The 5'-deoxy- 5'-pyridinium nucleoside salts C are converted to the corresponding 5'-deoxy-5'-tetrahydropyrido and substituted tetrahydropyrido nucleoside derivatives D, e.g., 2',3'-O-isopropylidene-5'-deoxy-5'-tetrahydropyridouridine (D; Y+Y'=isopropylidenedioxy,

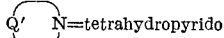

R²=uracil), by dissolving them in water or a suitable inert organic solvent, e.g., a lower alkanol such as methanol, ethanol, propanol, or the like, and reacting them with an alkali metal borohydride, such as lithium, sodium or potassium borohydride, at a temperature of from about 0° C. to about 100° C. and preferably at a temperature of from about 25° C. to about 90° C., for from about 1 to about 24 hours.

The 5'-deoxy-, 2',5'-dideoxy- and 2',3',5'-trideoxy-5'-pyridinium nucleoside salts represented by Formulas I, V and VI, respectively, and the 5'-deoxy-, 2',5'-dideoxy- and 2',3',5'-trideoxy-5'-tetrahydropyrido nucleosides represented by Formula VII hereinabove exhibit antimetabolic and antibacterial activity against a wide variety of organisms, including micro-organisms such as *Staphylococcus aureus, Proteus vulgaris, Klebsiella pneumoniae* and *Escherichia coli.*

In order that those skilled in the art can more fully understand the present invention, the following examples are set forth. These examples are given solely for the purpose of illustrating the invention, and should not be considered as expressing limitations unless so set forth in the appended claims.

PREPARATION A 1.8 grams of 6-azauridine were added to 75 ml. of acetone containing 0.06 ml. of aqueous 60% perchloric acid, and the resulting reaction mixture was allowed to stand for 24 hours at room temperature. Following this reaction period the reaction mixture was evaporated to dryness, and the residue was then crystallized from acetone/cyclohexane (1:1) to give a 78% yield of 2',3'-O-isopropylidene-6-azauridine, melting point 139–140° C.

By repeating this procedure using uridine, adenosine, guanosine and cytidine in place of 6-azauridine, all other factors being the same, the corresponding 2',3'-O-isopropylidene derivatives, namely, 2',3'-O-isopropylideneuridine, 2',3'-O-isopropylideneadenosine, 2',3'-O-isopropylideneguanosine and 2',3'-O-isopropylidenecytidine, respectively, were obtained.

PREPARATION B 2.3 grams of 2'-deoxyuridine in 10 cc. of pyridine were admixed with 0.8 gram of acetyl chloride, and the resulting reaction mixture was heated on a steam bath for 1 hour. Following this reaction period the reaction mixture was poured into ice water, and the thus-formed precipitate was collected by filtration, washed with water and dried. Recrystallization from methylene chloride/hexane gave 5'-O-acetyl-2'-deoxyuridine, melting point 96° C.

PREPARATION C

A solution of 2 grams of 5'-O-acetyl-2'-deoxyuridine, prepared as described in Preparation B hereinabove, in 30 cc. of benzene, was admixed with 4 cc. of dihydropyran and 2 cc. of the dihydropyran-benzene mixture was then distilled off to remove moisture. Next, the solution was cooled to room temperature, 0.4 gram of p-toluenesulfonic acid was added, and the resulting reaction mixture was then allowed to stand at room temperature for four days. Following this reaction period the reaction mixture was washed with an aqueous 5% sodium carbonate solution, then with water, and then dried over anhydrous sodium sulfate and evaporated to dryness. The resulting residue dissolved in hexane, was then chromatographed on neutral alumina, thus giving 5'-O-acetyl-2'-deoxy-3'-O-tetrahydropyranyluridine.

A suspension of one gram of the thus-prepared 5'-O-acetyl-2'-deoxy-3'-O-tetrahydropyranyluridine in 60 cc. of methanol was admixed with a solution of 1 gram of potassium carbonate in 6 cc. of water, and the resulting reaction mixture was then refluxed for 1 hour. Following this reaction period the reaction mixture was poured into ice water, and the thus-formed precipitate was collected by filtration and recrystallized from acetone/hexane, thus giving 2'-deoxy-3'-O-tetrahydropyranyluridine.

*Example I*

To a solution of 12 mmols (millimols) of 2',3'-O-isopropylideneuridine in 25 ml. of anhydrous pyridine, maintained at −20° C., there were added 15 mmols of freshly purified p-nitrobenzenesulfonyl chloride. The resulting reaction mixture was maintained at −20° C. for 1 hour, then stored overnight at 4° C. Following this reaction period 50 ml. of water were added to the reaction mixture, and the product was then extracted with ethyl acetate, washed with water and then with an aqueous 5% sodium bicarbonate solution, and then evaporated to dryness. Crystallization of the dry residue from methylene chloride/methanol gave a 66% yield of pure 2',3'-O-isopropylidene - 5'-O-p-nitrobenzenesulfonyluridine, melting point 199–200° C. *Analysis.*—Calc'd for $C_{18}H_{19}N_3O_{10}S$: C, 46.06; H, 4.08; N, 8.95. Found: C, 46.46; H, 4.37; N, 9.21.

This procedure was then repeated in every detail except for the following. First of all, 2',3'-O-isopropylideneuridine was replaced by 2',3'-O-isopropylideneadenosine, 2',3'-O-isopropylideneguanosine, 2',3'-O - isopropylidenecytidine, respectively. Secondly, p-nitrobenzenesulfonyl chloride was replaced by methanesulfonyl chloride, benzenesulfonyl chloride and p-toluenesulfonyl chloride, respectively. In every case, the corresponding 5'-alkyl- or -aryl-sulfonyloxy derivative, namely, 2',3'-O-isopropylidene - 5'-O-methanesulfonyladenosine, 2',3'-O-isopropylidene - 5' - O-benzenesulfonylguanosine and 2',3'-O-isopropylidene-5'-O-toluenesulfonylcytidine, respectively, was obtained.

Example II

Two mmols of 2',3'-O-isopropylidene-5'-O-p-nitrobenzenesulfonyluridine were added to 10 ml. of anhydrous pyridine, and the resulting reaction mixture, contained under a nitrogen atmosphere, was heated at 100° C. for 1 hour. Following this reaction period the reaction mixture was cooled to 20° C., evaporated to dryness and then lyophilized (i.e., "freeze dried," by first dissolving the dry residue in 25 ml. of water, then freezing this solution, and maintaining the frozen solution under vacuum until the water sublimes, leaving the product as a solid foam) to give 2',3' - O-isopropylidene-5'-deoxy-5-pyridiniumuridine p-nitrobenzenesulfonate as a white solid. *Analysis.*—Calc'd for $C_{23}H_{24}N_4O_{10}S$: C, 50.36; H, 4.41; N, 10.21. Found: C, 49.90; H. 4.76; N, 10.65.

$\lambda_{max.}^{H_2O}$ 259 m$\mu$.

By repeating this procedure in every detail except for the following, namely, replacing 2',3'-O-isopropylidene-5'-O-p-nitrobenzenesulfonyluridine with the remaining 5'-alkyl- and -arylsulfonyloxy derivatives prepared in Example I hereinabove, and replacing pyridine with α-collidine, 2,6-lutidine and β-picoline, the corresponding 5'-deoxy-5'-pyridinium nucleoside salts, namely, 2',3'-O-isopropylidene - 5' - deoxy-5'-(4-ethyl-2-methylpyridinium)adenosine methanesulfonate, 2',3'-O-isopropylidene-5'-deoxy-5'-(2,6-dimethylpyridinium)guanosine benzenesulfonate and (2',3' - O - isopropylidene - 5'-deoxy-5'-(3-methylpyridinium)cytidine p-toluenesulfonate, respectively, were obtained.

Example III

An aqueous 5% solution of the 2',3'-O-isopropylidene-5'-deoxy-5'-pyridiniumuridine p-nitrobenzenesulfonate obtained as described in Example II hereinabove was passed through a column of Dowex 1 ion-exchange resin in the chloride form and then lyophilized from water, thus giving a quantitative yield of 2',3'-O-isopropylidene-5'-deoxy-5'-pyridiniumuridine chloride monohydrate as a non-crystalline, hygroscopic white solid. *Analysis.*—Calc'd for $C_{17}H_{20}N_3O_5Cl \cdot H_2O$: C, 51.07; H, 5.55; N, 10.51. Found: C, 51.32; H, 5.87; N, 10.28.

$\lambda_{max.}^{H_2O}$ 259 m$\mu$ with typical pyridinium shoulders at 254 m$\mu$ and 265 m$\mu$, $\epsilon_{259}$=13,600.

This procedure was then repeated in every detail with one exception, namely, 2',3'-O-isopropylidene-5'-deoxy-5' - pyridiniumuridine p - nitrobenzenesulfonate was replaced by the remaining 5'-deoxy-5'-pyridinium nucleoside salts prepared as described in Example II hereinabove. In each case, the corresponding chloride, i.e., 2',3'-O-isopropylidene - 5' - deoxy - 5' - (4-ethyl-2-methylpyridinium) adenosine chloride, 2',3',-O-isopropylidene-5'-deoxy-5'-(2,6-dimethylpyridinium)guanosine chloride and 2',3'-O-isopropylidene-5'-deoxy-5'-(3 - methylpyridinium) cytidine chloride, respectively, was obtained.

Example IV 0.3 mmol of 2',3', - O - isopropylidene-5'-deoxy-5'-pyridiniumuridine hydrochloride was dissolved in 5 ml. of aqueous 90% formic acid, and the resulting solution was allowed to stand at room temperature (about 25° C.) for 3 days. Following this reaction period the formic acid was evaporated from the solution and the residue was lyophilized from water, thus giving an almost quantitative yield of chromatographically pure, hygroscopic 5'-deoxy-5'-pyridiniumuridine chloride. *Analysis.*—Calc'd for $C_{14}H_{16}N_3O_5$ Cl·3H$_2$O: C, 43.15; H, 5.79; N, 10.78. Found: C, 43.90; H, 5.30; N, 10.52.

By hydrolyzing in the same manner the etherified pyridinium nucleoside alkyl- and -arylsulfonates prepared as described in Example II hereinabove and the remaining etherified pyridinium nucleoside chlorides prepared as described in Example III hereinabove, the corresponding free 2',3'-dihydroxy pyridinium nucleoside salts, namely, 5'-deoxy-5'-pyridiniumuridine p - nitrobenzenesulfonate, 5'-deoxy-5'-(4 - ethyl - 2 - methylpyridinium) adenosine methane-sulfonate, 5'-deoxy-5'-(2,6-dimethylpyridinium) guanosine benzenesulfonate, 5'-deoxy-5'-(3 - methylpyridinium)cytidine p-toluenesulfonate, 5'-deoxy-5'-(4-ethyl-2-methylpyridinium)adenosine chloride, 5' - deoxy-5'-(2,6-dimethylpyridinium)guanosine chloride and 5'-deoxy-5 - (3 - methylpyridinium) cytidine chloride, respectively, were obtained.

Example V

To 120 mg. of 2',3'-O-isoproylidene-5'-deoxy-5'-pyridiniumuridine chloride, dissolved in 50 ml. of methanol, there were added 200 mg. of sodium borohydride, and the resulting reaction mixture was refluxed for 1 hour. This treatment resulted in a rapid decrease in the intensity of the ultraviolet absorption at 259 m$\mu$ and a disappearance of the pyridinium shoulders at 254 m$\mu$ and 265 m$\mu$. Following this reaction period the methanol was evaporated and the residue was dissolved in ethyl acetate and extracted several times with water. Next, the ethyl acetate layer was evaporated to dryness and the residue was dissolved in benzene, lyophilized and then chromatographed on a silicic acid column to give 2',3'-O-isopropylidene-5'-deoxy-5'-tetrahydropyridouridine as a non-crystalline, white solid which was homogeneous by paper and thin-layer chromatography. *Analysis.*—Calc'd for $$C_{17}H_{23}O_5N_3:$$

C, 58.44; H, 6.64; N, 12.03. Found: C, 59.54; H, 7.01; N, 10.80.

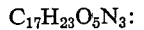$=259$ m$\mu$, $\epsilon_{259}=10,080$

Similarly, sodium borohydride reduction of the remaining etherified pyridinium nucleoside chlorides prepared as described in Example III hereinabove and of the free 2',3'-dihydroxy pyridinium nucleoside chlorides prepared as described in Example IV hereinabove gave the corresponding 5'-deoxy-5' - tetrahydropyrido nucleosides, i.e., 2',3'-O-isopropylidene - 5' - deoxy-5'-(4-ethyl - 2 - methyltetrahydropyrido)-adenosine, 2',3' - O - isopropylidene-5'-deoxy-5'-(2,6 - dimethyltetrahydropyrido)guanosine, 2'3'-O-isopropylidene-5'-deoxy - 5' - (3-methyletetrahydropyrido)cytidine, 5' - deoxy - 5' - tetrahydropyridouridine, 5'-deoxy-5'-(4-ethyl - 2 - methyltetrahydropyrido)adenosine, 5' - deoxy-5'-(2,6-dimethyl-tetrahydropyrido)guanosine and 5'-deoxy-5'-(3 - methyletetrahydropyrido)cytidine respectively.

Sodium borohydride reduction of the etherified pyridinium alkyl- and -arylsulfonates prepared as described in Example II hereinabove and of the free 2',3'-dihydroxy pyridinium nucleoside alkyl and arylsulfonates prepared as described in Example IV hereinabove gave the same 5'-deoxy-5'-tetrahydropyrido nucleosides as those just described hereinabove.

Example VI 0.1 mmol of 2',3-O-isopropylidene-5'-deoxy-5'-tetrahydropyridouridine was dissolved in 3 ml. of aqueous 90% formic acid, and the resulting solution was allowed to stand at room temperature for 24 hours. Following this reaction period the solution was evaporated to dryness and the residue was lyophilized from water, thus giving 5' - deoxy-5'-tetrahydropyridouridine as an amorphous, chromatographically homogeneous solid, identical to that prepared in Example V hereinabove.

By repeating this procedure in every detail but one, namely, replacing 2',3' - O - isopropylidene-5'-deoxy-5'-tetrahydropyridouridine with the remaining etherified 5'-deoxy - 5' - tetrahydropyridonucleosides prepared as described in Example V hereinabove, the corresponding free 2',3' - dihydroxy nucleosides, namely, 5' - deoxy-5'-(4-ethyl-2-methyltetrahydropyrido) adenosine, 5'-deoxy - 5' - (2,6-dimethyl-tetrahydropyrido) guanosine and 5' - deoxy-5' - (3 - methyltetrahydropyrido)cytidine, respectively, identical to those prepared in Example V hereinabove, were obtained.

*Example VII*

To a solution of 1.8 grams of 2′,3′-O-isopropylidene-6-azauridine in 25 ml. of anhydrous pyridine, maintained at −20° C., there were added 1.62 grams of freshly purified p-nitrobenzenesulfonyl chloride. The resulting reaction mixture was then maintained at −20° C. for 48 hours. Following this reaction period the solvent was evaporated under vacuum and the residue was dissolved in ethyl acetate and extracted with aqueous 1 M acetic acid, then with an aqueous 1 M sodium bicarbonate solution and then with water. The ethyl acetate solution was then dried over anhydrous sodium sulfate and evaporated to dryness, and the residue was then crystallized from monoglyme/cyclohexane (1:2, respectively) to give a 70% yield of 2′,3′-O-isopropylidene-5′-O-nitrobenzenesulfonyl-6-azauridine, melting point 162° C. with decomposition. *Analysis.*—Calc'd for $C_{17}H_{18}N_4O_{10}S$: C, 43.40; H, 3.85; N, 11.95. Found: C, 43.35; H, 3.99; N, 11.75.

This procedure was then repeated in every detail but one, namely, 2′,3′-O-isopropylidene-6-azauridine was replaced by 2′-deoxy-3′-O-tetrahydropyranyluridine, 2′-deoxy-3′-O-acetyluridine, 2′,3′-O-bis(acetyl)uridine, 2′,3′-dideoxyuridine and 2′,3′-dideoxy-6-azauridine, respectively (the latter two compounds having been prepared as described in copending U.S. patent application Serial No. 359,469, filed April 13, 1964). In every case, the corresponding 5′-p-nitrobenzenesulfonyl derivative, namely, 2′-deoxy-3′-O-tetrahydropyranyl-5′-O-p-nitrobenzenesulfonyluridine, 2′-deoxy-3′-O-acetyl-5′-O-p-nitrobenzenesulfonyluridine, 2′,3′-O-bis(acetyl)-5′-O-p-nitrobenzenesulfonyluridine, 2′,3′-dideoxy-5′-O-p-nitrobenzenesulfonyluridine and 2′,3′-dideoxy-5′-O-p-nitrobenzenesulfonyl-6-azauridine, respectively, was obtained.

*Example VIII*

Two hundred mg. of the 2′,3′-O-isopropylidine-5′-O-p-nitrobenzenesulfonyl-6-azauridine obtained as described in Example VII hereinabove was dissolved in 5 ml. of aqueous 90% formic acid, and the resulting solution was allowed to stand at room temperature for 24 hours. Following this reaction period the formic acid was evaporated and the residue lyophilized from dioxane and then crystallized from dioxane/cyclohexane (1:9, respectively), thus giving a 75% yield of 5′-O-p-nitrobenzenesulfonyl-6-azauridine, melting point 142–145° C. This product crystallized with one mol of dioxane. *Analysis*—Calc'd for $C_{14}H_{14}N_4O_{10}S \cdot C_4H_8O_2$: C, 41.71; H, 4.26; N, 10.80. Found: C, 41.76; H, 4.40; N, 10.40.

By repeating this procedure using 2′-deoxy-3′-O-tetrahydropyranyl-5′-O-p-nitrobenzenesulfonyluridine instead of 2′,3′-O-isopropylidene-5′-O-p-nitrobenzenesulfonyl-6-azauridine, 2′-deoxy-5′-O-p-nitrobenzenesulfonyluridine was obtained.

*Example IX*

A solution of 1 gram of 2′-deoxy-3′-O-acetyl-5′-O-p-nitrobenzenesulfonyluridine in 50 cc. of an aqueous 0.1 N sodium hydroxide solution was allowed to stand at room temperature overnight, then neutralized with acetic acid and concentrated under reduced pressure. Extraction with diethyl ether followed by chromatography of the extract on neutral alumina gave 2′-deoxy-5′-O-p-nitrobenzenesulfonyluridine.

By repeating this procedure using 2′,3′-O-bis(acetyl)-5′-O-p-nitrobenzenesulfonyluridine as the nucleoside starting material, 5′-O-p-nitrobenzenesulfonyluridine was obtained.

*Example X*

A solution of 650 mg. of 2′,3′-O-isopropylidene-5′-O-p-nitrobenzenesulfonyl-6-azauridine in 12 ml. of anhydrous pyridine, contained under a nitrogen atmosphere, was heated for 4.5 hours in a boiling water bath. Following this reaction period the reaction mixture was cooled to 25° C. and evaporated to dryness. The residue was then partitioned between water and ethyl acetate, and the water layer was lyophilized and then crystallized from methanol/dioxane, thus giving an almost quantitative yield of 2′,3′-O-isopropylidene-5′-deoxy-5′-pyridinium-6-azauridine - nitrobenzenesulfonate in crystalline form, melting point 263–264° C. *Analysis.*—Calc'd for $C_{22}H_{23}N_5O_{10}S$: C, 48.09; H, 4.22; N, 12.74. Found: C, 48.03; H, 4.39; N, 12.72.

This procedure was then repeated in every detail except for the following. First of all, 2′,3′-O-isopropylidene-5′-O-p-nitrobenzenesulfonyl-6-azauridine was replaced by the remaining 5′-O-p-nitrobenzenesulfonyloxy derivatives obtained as described in Example VII hereinabove. Secondly, pyridine was replaced by γ-collidine, 3,4-lutidine, α-picoline, β-collidine and 2,4-lutidine. In each case, the corresponding 5′-deoxy-5′-pyridinium p-nitrobenzenesulfonate, namely, 2′,5′-dideoxy-3′-O-tetrahydropyranyl-5′-(2,4,6-trimethylpyridinium)uridine p-nitrobenzenesulfonate, 2′,5′-dideoxy-3′-O-acetyl-5′-(3,4-dimethylpyridinium)uridine p-nitrobenzenesulfonate, 2′,3′-O-bis(acetyl)-5′-deoxy-5′-(2-methylpyridinium)uridine p-nitrobenzenesulfonate, 2′,3′,5′-trideoxy-5′-(3-ethyl-4-methylpyridinium)uridine p-nitrobenzenesulfonate and 2′,3′,5′-trideoxy-5′-(2,4-dimethylpyridinium)-6-azauridine p-nitrobenzenesulfonate, respectively, was obtained.

Similarly, using the 2′-deoxy-5′-O-p-nitrobenzenesulfonyluridine prepared as described in Examples VIII and IX hereinabove as the nucleoside starting material, 5′-deoxy-5′-pyridinium-6-azauridine p-nitrobenzenesulfonate and 2′,5′-dideoxy-5′-pyridiniumuridine p-nitrobenzenesulfonate, respectively, were obtained.

*Example XI*

An aqueous 1% solution of the 2′,3′-O-isopropylidene-5′-deoxy-5′-pyridinium-6-azauridine p-nitrobenzenesulfonate obtained as described in Example X hereinabove was passed through a column of Dowex 2 (divinylbenzene cross-linked polystyrene beads substituted with dimethylethanolbenzylammonium groups) ion-exchange resin in the chloride from (6 mls. per 250 mg.) and then lyophilized from water, thus giving an almost quantitative yield of 2′,3′-O-isopropylidene-5′-deoxy-5′-pyridinium-6-azauridine chloride monohydrate. *Analysis.*—Calc'd for $C_{16}H_{19}N_4O_5Cl \cdot H_2O$: C, 47.94; H, 5.28; N, 13.98. Found: C, 47.60; H, 5.60; N, 14.61.

This procedure was then repeated in every detail except for the following. First of all, 2′,3′-O-isopropylidene-5′-deoxy-5′-pyridinium-6-azauridine p-nitrobenzenesulfonate was replaced by the remaining 5′-deoxy-5′-pyridinium p-nitrobenzenesulfonates prepared as described in Example X hereinabove. Secondly, the Dowex 2 ion-exchange resin in the chloride form was replaced by Amberlite IRA–400 (a quaternary ammonium polystyrene resin, aminated with trimethylamine), ion-exchange resin in the acetate form, Amberlite IRA–410 (a quaternary ammonium polystyrene resin, aminated with dimethylethanolamine) ion-exchange resin in the nitrate form, Dowex 1 ion-exchange resin in the bromide form, Amberlite IRA–400 ion-exchange resin in the chloride form, Amberlite IRA–410 ion-exchange resin in the bromide form, Dowex 2 ion-exchange resin in the benzoate form and Dowex 2 ion-exchange resin in the iodide form. In each case, the corresponding 5′-deoxy-5′-pyridinium nucleoside salt, namely, 2′,5′-dideoxy-3′-O-tetrahydropyranyl-5′-(2,4,6-trimethylpyridinium)uridine acetate, 2′,5′-dideoxy-3′-O-acetyl-5′-(3,4-dimethylpyridinium)uridine nitrate, 2′,3′-O-bis(acetyl)-5′-deoxy-5′-(methylpyridinium)uridine bromide, 2′,3′5′-trideoxy-5′-(3-ethyl-4-methylpyridinium)uridine chloride, 2′,3′,5′-trideoxy-5′-(2,4-dimethylpyridinium)-6-azauridine bromide, 5′-deoxy-5′-pyridinium-6-azauridine benzoate and 2′,5′-dideoxy-5′-pyridinium iodide, respectively, was obtained.

Similarly, by passing an aqueous 1% solution of the 5′-deoxy-5′-pyridinium-6-azauridine p-nitrobenzenesulfonate obtained as described in Example X hereinabove through a column containing Dowex 2(Cl⁻) ion-exchange resin and lyophilizing the eluate first from water and then from dioxane, 5′-deoxy-5′-pyridinium-6-azauridine chloride was obtained. *Analysis.*—Calc'd for $$C_{13}H_{15}N_4O_5Cl$$

C, 45.56; H, 4.41; Cl, 10.34. Found: C, 45.43; H, 4.52; Cl, 10.24

*Example XII*

To the 5′-deoxy-5′-pyridinium-6-azauridine chloride obtained as described in Example XI hereinabove, dissolved in 5 ml. of water, there was added 60 mg. of sodium borohydride. The resulting reaction mixture was allowed to stand at room temperature for 3 hours, following which it was brought to pH 3 with aqueous hydrochloric acid and then passed through a column containing Amberlite IRC–50 (copolymeric styrene beads containing free carboxyl groups) ion-exchange resin, using a gradient of 0 up to 0.2 N aqueous HCl as the eluant, thus giving 5′-deoxy-5′-tetrahydropyrido-6-azauridine, which was isolated as the hydrochloride by lyophilization.

By repeating this procedure using the 5′-deoxy-5′-pyridinium nucleoside alkyl- and arylsulfonate salts prepared as described in Example X hereinabove in place of 5′-deoxy-5′-pyridinium-6-azauridine chloride, the corresponding 5′-deoxy-5′-tetrahydropyrido nucleosides, i.e., 2′,3′-O-isopropylidene-5′-deoxy - 5′ - tetrahydropyrido-6-azauridine, 2′,5′-dideoxy-3′-O-tetrahydropyranyl-5′-(2,4,6-trimethyltetrahydropyrido)uridine, 2′,5′ - dideoxy-3′-O-acetyl-5′-(3,4-dimethyltetrahydropyrido)uridine, 2′,3′-bis(acetyl) - 5′-deoxy - 5′ - (2 - methyltetrahydropyrido)uridine, 2′,3′,5′-trideoxy-5′-(3-ethyl - 4 - methyltetrahydropyrido)uridine, 2,′3′,5′-trideoxy-5′-(2,4-dimethyltetrahydropyrido)-6-azauridine, 5′-deoxy - 5′ - tetrahydropyrido-6-azauridine and 2′,5′-dideoxy-5′-tetrahydropyridouridine, respectively, were obtained.

In the case of the 5′-deoxy-5′-pyridinium salt starting materials containing acid-labile protective groupings, i.e., isopropylidene and tetrahydropyranyl ethers, the products were treated with aqueous 90% formic acid at room temperature for 1–2 days to remove these groups prior to ion-exchange separation.

Sodium borohydride reduction of the 5′-deoxy-5′-pyridinium nucleoside salts prepared as described in Example XI hereinabove gave the same 5′-deoxy-5′-tetrahydropyrido nucleosides as those just described hereinabove.

*Example XIII*

A solution of 1 gram of 2′,5′-dideoxy-3′-O-acetyl-5′-(3,4-dimethyltetrahydropyrido)uridine in 50 cc. of methanol was refluxed for 3 hours with 500 mg. of potassium hydroxide dissolved in 1 cc. of water. Following this reaction period the reaction mixture was cooled to room temperature, then poured into ice water. The resulting precipitate was collected by filtration, washed with water until neutral and then dried. Crystallization from methylene chloride/diethyl ether gave 2′,5′-dideoxy-5′-(3,4-dimethyltetrahydropyrido)uridine.

By repeating this procedue in every detail but one, namely, replacing 2′,5′-dideoxy-3′-O-acetyl-5′-(3,4-dimethyltetrahydropyrido)uridine with 2′,5′-O-bis(acetyl)-5′-deoxy-5′-(2-methyltetrahydropyrido)uridine as the nucleoside starting material, 5′-deoxy-5′-(2-methyltetrahydropyrido)uridine was obtained.

It will be obvious to those skilled in the art that other changes and variations can be made in carrying out the present invention without departing from the spirit and scope thereof as defined in the appended claims.

We claim:
1. A compound represented by the general formula:

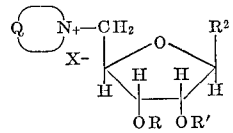

wherein R and R¹, together with the oxygen atoms to which they are attached, represent a member selected from the group consisting of hydroxyl, acyloxy and labile ether groups, R₂ is selected from the group consisting of substituted purine and pyrimidine bases,

represents the residue of a pyridine base, and X⁻ represents a salt-forming anion.

2. 2′,3′ - O - isopropylidene-5′-deoxy-5′-pyridiniumuridine p-nitrobenzenesulfonate.
3. 2′,3′ - O - isopropylidene-5′-deoxy-5′-pyridiniumuridine chloride.
4. 5′-deoxy-5′-pyridiniumuridine p-nitrobenzenesulfonate.
5. 5′-deoxy-5′-pyridiniumuridine chloride.
6. 2′,3′ - O - isopropylidene-5′-deoxy-5′-(2,6-dimethylpyridinium)guanosine chloride.
7. 2′,3′ - O - isopropylidene - 5′-deoxy-5′-(4-ethyl-2-methylpyridinium)adenosine chloride.
8. 5′ - deoxy - 5′-(3-methylpyridinium)cytidine chloride.
9. 2′,3′ - O - isopropylidene-5′-deoxy-5′-pyridinium-6-azauridine p-nitrobenzenesulfonate.
10. 2′,3′ - O - isopropylidene-5′-deoxy-5′-pyridinium-6-azauridine chloride.
11. 5′-deoxy-5′-pyridinium-6-azauridine chloride.
12. 2′,3′ - O - bis(acetyl)-5′-deoxy-5′-(2-methylpyridinium)uridine bromide.
13. A compound represented by the general formula:

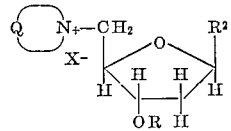

wherein R, together with the oxygen atom to which it is attached, represents a member selected from the group consisting of hydroxyl, acyloxy and labile ether groups, R² is selected from the group consisting of substituted purine and pyrimidine bases,

represents the residue of a pyridine base, and X⁻ represents a salt-forming anion.

14. 2′,5′ - dideoxy - 3′-O-tetrahydropyranyl-5′-(2,4,6-trimethylpyridinium)uridine acetate.
15. 2′,5′ - dideoxy-3′-O-acetyl-5′-(3,4-dimethylpyridinium)uridine nitrate.
16. 2′,5′-dideoxy-5′-pyridiniumuridine iodide.
17. A compound represented by the general formula:

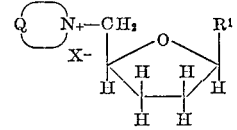

wherein R² is selected from the group consisting of substituted purine and pyrimidine bases,

represents the residue of a pyridine base, and X⁻ represents a salt-forming anion.

18. 2',3',5' - trideoxy-5'-(3-ethyl-4-methylpyridinium) uridine chloride.

19. 2',3'-5' - trideoxy-5'-(2,4-dimethylpyridinium)-6-azauridine bromide.

20. A compound represented by the general formula:

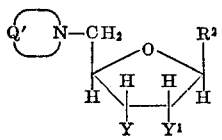

wherein Y and Y' represent a member selected from the group consisting of hydrogen, hydroxyl, acyloxy and labile ether groups, with Y' being hydrogen when Y is hydrogen, $R^2$ is selected from the group consisting of substituted purine and pyrimidine groups, and

represents a tetrahydropyrido group.

21. 2',3' - O - isopropylidene-5'-deoxy-5'-tetrahydropyridouridine.

22. 5'-deoxy-5'-tetrahydropyridouridine.

23. 5'-deoxy-5'-tetrahydropyrido-6-azauridine.

24. 2',5' - dideoxy-5'-(3,4-dimethyltetrahydropyrido) uridine.

No references cited.

LEWIS GOTTS, *Primary Examiner.*

JOHNNIE R. BROWN, *Assistant Examiner.*

UNITED STATES PATENT OFFICE
CERTIFICATE OF CORRECTION

Patent No. 3,281,410                                          October 25, 1966

Heinrich H. Peter et al.

It is hereby certified that error appears in the above numbered patent requiring correction and that the said Letters Patent should read as corrected below.

Column 12, lines 63 to 68, the formula should appear as shown below instead of as in the patent:

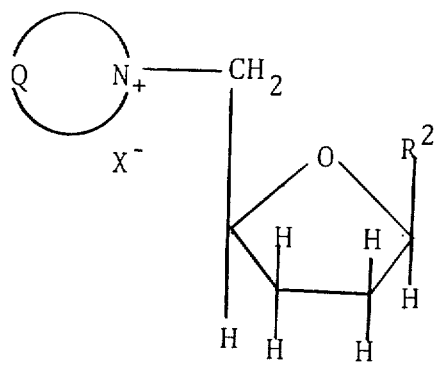

column 13, lines 6 to 13, the formula should appear as shown below instead of as in the patent:

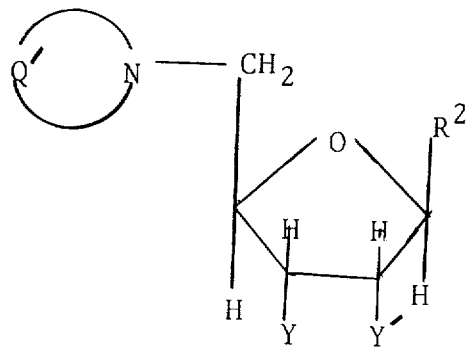

Signed and sealed this 5th day of September 1967.

(SEAL)
Attest:

ERNEST W. SWIDER                                    EDWARD J. BRENNER
Attesting Officer                                   Commissioner of Patents